Patented Dec. 1, 1936

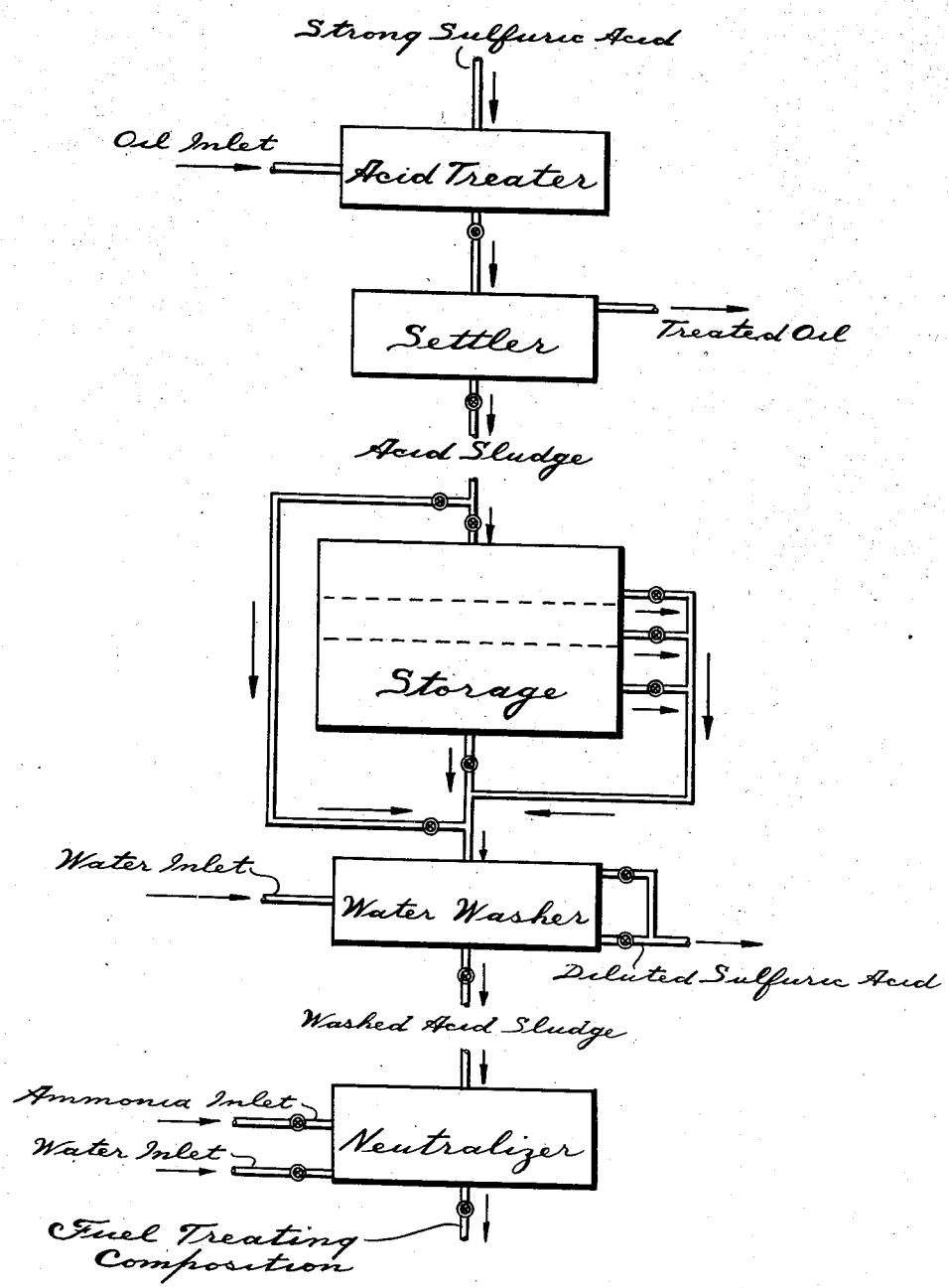

2,062,350

UNITED STATES PATENT OFFICE 2,062,350

FUEL COATING COMPOSITION

Ejnar W. Carlson and Peter J. Wiezevich, Elizabeth, N. J., assignors to Standard Oil Development Company, a corporation of Delaware Application November 8, 1932, Serial No. 641,700

4 Claims. (Cl. 44—6)

This invention relates to an improved antidusting composition for solid fuels and to methods for preparing same.

Sulfonic compounds, such as the sulfonic acids and their salts obtained by the sulfonation of naphthalene, benzene, higher alcohols, organic sulfur compounds, hydrocarbon oils and the like, are effective in decreasing the tendency of solid carbonaceous fuels, such as coal, coke, briquettes and the like, to form dust or to crack into fines. Water-soluble sulfonated products, and particularly the neutralized sulfonated products obtained in the treatment of heavy petroleum oils with strong or fuming sulfuric acid, are preferred for this use. A dilute solution of these sulfonates is used for spraying or dipping the fuel.

Suitable sulfonates such as the water-soluble alkali metal sulfonates obtained from petroleum oil acid sludge have been used for this purpose and are described in the co-pending application Ser. No. 580,738, filed December 12, 1931, by Per K. Frolich. However, aqueous solutions of these alkali metal sulfonates are not stable at the low temperatures to be encountered in transportation and use under winter conditions. These solutions separate into two dissimilar layers when subjected for even a short period of time to temperatures of about 0 to 30° F. The solution is less effective as a fuel treating agent if used in this separated or polyphase condition and can be rendered again homogeneous only with extreme difficulty.

It has now been found that the ammonium soaps of similar sulfonated products of aromatic hydrocarbons, higher alcohols, organic sulfur compounds, hydrocarbon oils and the like, are very effective fuel treating agents. Aqueous solutions of these ammonium sulfonates may be prepared which possess the desirable quality of being stable in the cold for extended periods of time.

The following example illustrates one preferred method for preparing such ammonium sulfonate treating compositions.

Example 1

This example is described in reference to the drawing which illustrates in diagrammatic form the flow of materials. A heavy viscous petroleum oil fraction suitable for the preparation of lubricating oils or white oils was vigorously agitated with about 10% by volume of a 15% strength fuming sulfuric acid. The acid sludge was allowed to settle and was separately drawn off. The oil was then subjected to vigorous agitation with a second batch of fresh acid of similar strength in an amount about 5% by volume of the original oil. The temperature of the oil and acid mixture during these treats was maintained preferably below about 100° F., say from 60–100° F. The mixture was passed to a sludge settling drum where on standing the treated oil separated as a top layer and was withdrawn. 4700 gallons of this "second treat acid sludge" separated into two layers on standing for 24 hours, the upper layer containing 3400 gallons and the bottom layer 1300 gallons. The bottom layer and a part of the upper layer were forced by compressed air into a lead lined kettle containing 1500 gallons of water at 158° F. This sludge charge amounted to 1800 gallons and contained 63% of sulfuric acid. (The concentrations of sulfuric acid in acid sludge mentioned in this application are actually the per cent by weight of inorganic salts in the sludge after neutralization with ammonia and drying at 220° F.) The sludge was transferred in one hour, and at the end of this period the temperature of the kettle was 218° F.

The mixture was settled for one hour. An aqueous bottom layer consisting of 1800 gallons of 41% sulfuric acid (by weight, determined by titration of free acid) separated and was then drawn off. The remaining sludge containing 38% sulfuric acid was then washed with 700 gallons of water with agitation by blowing with steam and air at 194° F. After settling, 700 gallons of a lower aqueous layer containing 31% sulfuric acid was drawn off. The remaining sludge then contained 26% sulfuric acid. A third wash with 725 gallons of water was conducted under the same conditions. In this case the aqueous layer formed on settling contained 16% sulfuric acid and separated as a top layer because of its low density. 800 gallons of this upper layer were removed by decantation. The sludge then contained 18% sulfuric acid. Aqua ammonia was added to this sludge with agitation until the color changed from green to brown. Water was added to adjust the concentration of the solution to 50% solids.

The 50% solids concentration obtained above is suitable for distribution to the trade for use in treating solid fuels. It is preferably diluted with additional water before use. The preferred strength for application as a spray to coal, coke and the like is about 2 to 15% solids, although higher or lower concentrations may be used if desired.

Both the 50% solids trade concentration of the neutralized sludge, considered as ammonium sulfonates, and the 2 to 15% treating concentration will be found to pass the following "cold test". This consists in maintaining a sample of the treating agent for four hours at 0° F. and then permitting it to warm up gradually to room temperature. The material does not pass this test if a bottom layer or sediment can be observed when the bottle containing the sample is slowly turned upside down either at the end of the four hour period at 0° F. or after warming up to room temperature. It has not been found possible to prepare a sodium sulfonate treating agent from petroleum acid sludges which will pass this test. The ammonium sulfonate treating agents, especially if prepared according to the above described process, will generally be found to pass the cold test satisfactorily.

The products of reaction of nitrogenous bases with sulfonic acids generally may be used as fuel treating agents and are considered within the scope of this invention. For example, amino bases such as the amines, substituted amines such as the di- and tri-alkyl amines, the alkyl amino carbinols such as triethanolamine, and the like may be used in place of ammonia to neutralize the washed acid sludge of the above example, or to neutralize other suitable sulfonated compounds. Such products are classified as amino sulfonates for the purpose of this invention. The methods and materials used in preparing the ammonium sulfonates from sulfonated products will be found to affect the stability of the resulting fuel treating solutions very appreciably. It is preferable that the sulfonic acids used should be substantially free of water-insoluble material, such as asphalt, and that they should have a combining weight below about 450, say from 300 to 450. It is accordingly preferred in obtaining the sulfonates by acid treating petroleum oil to apply the acid in a number of separate treats, and to discard the sludge formed in the first acid treat. Sufficient acid is used in the first treat to remove substantially all asphaltic material from the oil. Usually the first treat will consist of about 10% by volume of 15% strength fuming acid, and the amount of acid is decreased in each successive treat to a final figure of about 5%. The sludges from the successive treats are generally suitable, and may be used together or separately for the preparation of the herein described ammonium sulfonates. These successive treats, excepting the first are classified together as "second treat acid sludge" for the purpose of this invention. It is preferred to conduct all acid treats at as low a temperature as possible, say from 60 to 100° F.

When the "second treat acid sludge" is permitted to stand it may separate into layers. For example, a lower layer containing about 70% sulfuric acid may separate from an upper layer containing about 40% sulfuric acid. A middle layer, appearing to be an emulsion of upper and lower layers, may also form. The lower layer may be washed with water very easily and permits a ready separation of the diluted acid from the washed sludge, as shown in the washing operations of the above example. The middle and upper layers can often be washed in a similar manner, but will be found to emulsify with water much more readily than the bottom layer. With some sludges a very stable "mayonnaise-like" emulsion may be formed, but these emulsions can be separated by slow agitation or "squeezing" out the sulfuric acid phase.

The most desirable way to produce the fuel treating agent is to wash the complete supply of sludge with water, separate and draw off the sulfuric acid, and neutralize the remaining sludge with ammonia. However, due to the varying nature of the sludge, in some cases the total sludge cannot be washed successfully due to emulsification. The sludge may then be allowed to separate into layers, and the layers may be washed separately. In such event it is advantageous to wash a limited mixture of the layers, containing say all the lower layer and as much of the upper layers as will permit a ready separation of sulfuric acid. The conditions best suited for obtaining a washed acid sludge from any given acid sludge are best determined by small scale tests involving settling of the sludge and washing of the separate or mixed layers as above described.

In carrying out the separation of the sulfuric acid, it is essential that the nature of the sulfonic acids be altered as little as possible. If the temperature is too high the combining weight of the acids rises markedly especially in the presence of live steam and strong sulfuric acid, causing instability and insolubility. It is preferable to keep the combining weight below about 450 by holding the temperature below 225° F. when large amounts of strong sulfuric acid are present.

When all of the top layer sludge is not washed with the bottom layer, that remaining may be used for the preparation of the desired fuel treating agents as illustrated by the following example.

*Example 2*

1600 gallons of the remaining top layer of the second treat acid sludge from Example 1, containing 55% sulfuric acid, was added to 6500 gallons of water at 176° F. and was stirred for one hour with live steam and air, the final temperature reaching 203° F. After settling for 16 hours 5550 gallons of a top aqueous layer containing 8% sulfuric acid was drawn off, leaving 2550 gallons of sludge containing 15% sulfuric acid. This washed sludge was neutralized with 28° Bé. ammonia water and the concentration of the neutralized sludge adjusted to 50% solids. On subjecting a 15% solids aqueous solution of this product to the above described cold test a viscous bottom layer appeared. However, when this product was mixed with the product of Example 1, the mixture showed no separation during the cold test and was entirely satisfactory as a fuel treating agent.

The water used in all steps for washing the sludges in the above examples may contain a suitable electrolyte or coagulating agent for aiding the separation of the sludge from the sulfuric acid. Such agents are sodium chloride, ammonium sulfate, hydrochloric acid, and the like.

It is desirable to use as treating agents ammonium sulfonate solution containing not more than about 25% of inorganic salts by weight, based on the total solids on drying at 220° F., and solutions containing less than 10 or 15% are preferred. Consequently, when preparing the ammonium sulfonate from acid sludge, it is desirable to wash the sludge to below the corresponding content of sulfuric acid, that is, to below 25, 15, or 10%. The inorganic salts will be found to increase the viscosity of the solution, to have an adverse effect on the "cold test", and to have a tendency to separate out in the form of a concentrated salt solution on long standing. It is also desirable to use the washed sludge in a substantially neutral form in order to avoid corrosive effects, but compositions only partially neutralized with ammonia are also stable and are effective as fuel treating agents.

An important property of these sulfonates which makes them highly desirable for treating solid fuels is their exceptionally high wetting power. This is illustrated in the following table, which gives results of comparative tests of the time required to wet one half inch of a strip of paper towel dipped vertically into the surface of an aqueous solution of the treating agent. The "coal treating agents" mentioned are samples of materials sold commercially for this purpose.

| Treating agent | Concentration percent | Time seconds |
|---|---|---|
| Ammonium sulfonates | 2.5 | 45 |
| Water | | 135 |
| Calcium chloride | 2.5 | 190 |
| Coal treating agent A | 2.5 | 240 |
| Coal treating agent B | 2.5 | 315 |
| Coal treating agent C | 2.5 | Greater than 360 |

It has been found that a considerable reduction in fracture and dusting is obtained by the use of ammonium sulfonates as fuel treating agents. The fuel, such as coal, coke, fines, briquettes and the like may be sprayed with a solution of the ammonium sulfonates or may be dipped into such solutions. This reduction in fracture is especially important in the case of soft coal, which when handled under ordinary conditions without treatment may show a degradation to fines of even 15 to 20%. The application as a spray of 4 gallons of a 12% sulfonate solution per ton of nut size bituminous coal has been found to reduce the normal fracture by 60% and the dust by 84%.

The best results are obtained if the fuel is treated with a sufficient volume of the solution to wet its entire surface and larger amounts are not objectionable. Generally, not less than about 1 to 4 pounds of solid ammonium sulfonates in solution are desired for treating one ton of most solid fuels. For example, the use of 4½ gallons of a 7% solution of sulfonates may be used to reduce the dusting of bituminous coal, while for coke or anthracite coal about 2 to 3 gallons of a 12% solution of sulfonates give satisfactory results.

The term "sulfonate" is used herein and in the claims to signify a salt of an acidic compound of the type obtained by reaction of an organic compound with strong or fuming sulfuric acid, and does not include the so-called "ligno-sulfonic" compounds derived from wood sulfite liquor, a by-product of paper manufacture.

This invention is not to be limited to any specific example which is presented herein solely for purpose of illustration nor to any theory regarding the composition of our improved treating agents, but only by the following claims in which we wish to claim all novelty insofar as the prior art permits.

We claim:

1. A composition of matter for coating solid carbonaceous fuels, stable against separation in dissimilar layers when allowed to stand at temperatures of about 0 to 30° F., consisting of an aqueous substantially neutral solution containing 2 to 25% of water soluble salts of sulfonic acids derived from petroleum oil acid sludge with a nitrogenous base selected from the group consisting of ammonia, amines, alkyl-amino-carbinols.

2. A composition according to claim 1 in which the salts are salts of sulfonic acids having a combining weight of 300 to 450.

3. A composition according to claim 1 in which the salts are present in 10 to 15% concentration.

4. A composition of matter for coating solid carbonaceous fuels, stable against separation into dissimilar layers when allowed to stand at temperatures of about 0 to 30° F., consisting of an aqueous neutral solution containing about 10 to 15% of water soluble ammonium salts of sulfonic acids having a combining weight of 300 to 450, derived from petroleum oil acid sludge.

EJNAR W. CARLSON.
PETER J. WIEZEVICH.